United States Patent
Baumeister et al.

(10) Patent No.: US 11,156,758 B2
(45) Date of Patent: Oct. 26, 2021

(54) ILLUMINATION DEVICE FOR COOKING APPARATUS

(71) Applicant: BJB GmbH & Co. KG, Arnsberg (DE)

(72) Inventors: Olaf Baumeister, Sundern (DE); Joerg Harnischmacher, Menden (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 17/019,610

(22) Filed: Sep. 14, 2020

(65) Prior Publication Data
US 2021/0132280 A1 May 6, 2021

(30) Foreign Application Priority Data

Nov. 6, 2019 (DE) .......................... 202019106169.3

(51) Int. Cl.
*G02B 6/00* (2006.01)
*F21V 8/00* (2006.01)
*F24C 15/00* (2006.01)

(52) U.S. Cl.
CPC .......... *G02B 6/0008* (2013.01); *F24C 15/008* (2013.01); *G02B 6/0006* (2013.01)

(58) Field of Classification Search
CPC .... F24C 15/008; G02B 6/0006; G02B 6/0008
See application file for complete search history.

(56) References Cited

U.S. PATENT DOCUMENTS

2011/0049120 A1* 3/2011 Reinhard-Herrscher ................... F24C 15/008
219/220
2013/0201657 A1* 8/2013 Arrigoni .............. G02B 6/0048
362/92

FOREIGN PATENT DOCUMENTS

EP 3359881 A1 8/2018
WO WO2013098018 A1 7/2013

* cited by examiner

*Primary Examiner* — Anne M Hines
(74) *Attorney, Agent, or Firm* — Von Rohrscheidt Patents

(57) ABSTRACT

An illumination device for a cooking apparatus, the illumination device including a light source; and a light conductor rod that transmits light emitted by the light source to a cooking cavity, wherein the light conductor rod is a rigid light conductor rod that is configured to penetrate an opening in a cooking cavity wall, wherein an angled end of the light conductor rod that is oriented away from the light source is angled relative to a longitudinal axis of the light conductor rod at an angle so that light exiting from the angled end is introducible into the cooking cavity at an angle relative to the longitudinal axis of the light conductor rod.

9 Claims, 2 Drawing Sheets

ILLUMINATION DEVICE FOR COOKING APPARATUS

RELATED APPLICATIONS

This application claims priority from and incorporates by reference German utility model DE 20 2019 106 169.3, filed on Nov. 6, 2019.

FIELD OF THE INVENTION

The invention relates to an illumination device for a cooking apparatus, in particular for an oven, a steam cooker or a microwave oven.

BACKGROUND OF THE INVENTION

Generic illumination devices for cooking apparatuses are well known in the art. They are being used to illuminate a cooking cavity of a cooking apparatus. Thus a cooking cavity wall includes one or plural cut outs through which a respective lamp component can be run. Typically these are lamp covers wherein an illumination device that is arranged outside of the cooking cavity conducts light through the lamp cover into the cooking cavity.

In household appliances more and more LEDs are being used as light sources to illuminate cooking cavities. Thus, there is a problem in that LED illuminants are sensitive to high temperatures and therefore have to be protected against a radiant heat from the cooking cavity by keeping them at a large distance from the cooking cavity and by using other measures. Therefore there is a trend to position the lamp at an installation location that is favorable for the LED illuminant and to conduct the light from there through light conductors into the cooking cavity. Rigid light conductor rods made from glass or suitable high temperature resistant synthetic materials have proven to be particularly suitable. The light conductor rods are inserted through a cooking cavity ceiling or a cooking cavity floor and are arranged in the cooking cavity. Special coatings provide that the light exits over an entire length of the light conductor rod so that the light conductor rod illuminates each cooking level of the cooking apparatus.

BRIEF SUMMARY OF THE INVENTION

Thus, it is an object of the invention to provide an improved illumination device for cooking apparatuses.

The object is achieved by an illumination device for a cooking apparatus, the illumination device including a light source; and alight conductor rod that transmits light emitted by the light source to a cooking cavity, wherein the light conductor rod is a rigid light conductor rod that is configured to penetrate an opening in a cooking cavity wall, wherein an angled end of the light conductor rod that is oriented away from the light source is angled relative to a longitudinal axis of the light conductor rod at an angle so that light exiting from the angled end is introducible into the cooking cavity at an angle relative to the longitudinal axis of the light conductor rod.

It is an essential advantage of the invention that a punctiform light source penetrates the cooking cavity wall at a suitable position so that the wall opening can be kept to a minimum size. This reduces heat loss from the cooking cavity into the equipment cavity and thus reduces thermal loads on the technical equipment, in particular the LED light source.

An advantageous embodiment of the invention is characterized in that a curvature of the light conductor rod is kept within limits of total reflection of the light conductor rod material. This way a light loss between the feed into the light conductor and the light exit is effectively prevented so that the light has a high level of efficiency.

In an advantageous embodiment the light conductor rod is provided with a reflective coating in a portion of the curvature caused by the angle. In particular when installation conditions necessitate an angle beyond a total reflection of the light conductor rod, light that exits from the light conductor rod can be fed back by the coating wherein a reflective surface of the coating is oriented towards a surface of the light conductor rod. This way light losses are reduced even when the curvature is outside of limits of a total reflection.

An embodiment of the invention provides that the light conductor rod forms a light exit surface at a light exit end wherein the light exit surface is provided with an optical structure that orients the light in a defined direction. Contrary to typical satin coatings structures of this type facilitate orienting the exiting light in a controlled manner instead of merely achieving a diffused light distribution. Due to these optical structures or optical elements, e.g. micro optical structures in the micro or nanometer range, an unfavorable light distribution that is created by insufficient curving capability of the light conductor rod can be corrected. Corner or edge portions of a cooking cavity that are particularly difficult to illuminate can be illuminated this way in a controlled manner.

The object is also achieved by a cooking apparatus with a cooking cavity that is enveloped by a cooking cavity wall, wherein the cooking cavity wall includes an opening through which a lamp element of an illumination device is run that is used for illuminating a cooking cavity and includes an illumination device according to one of the claims 1-4 wherein a section of the light conductor rod is arranged between the light source and the angled end outside of the cooking cavity.

In an advantageousness embodiment it is provided that the curvature of the angled end is oriented towards the cooking cavity wall.

It is furthermore provided in according to the invention that a section of the light conductor that is downstream of the curvature is run through the opening in the cooking cavity wall.

BRIEF DESCRIPTION OF THE DRAWINGS

Further advantages of the invention are described based on an embodiment with reference to drawing figures, wherein.

DETAILED DESCRIPTION OF THE INVENTION

Figure 1:
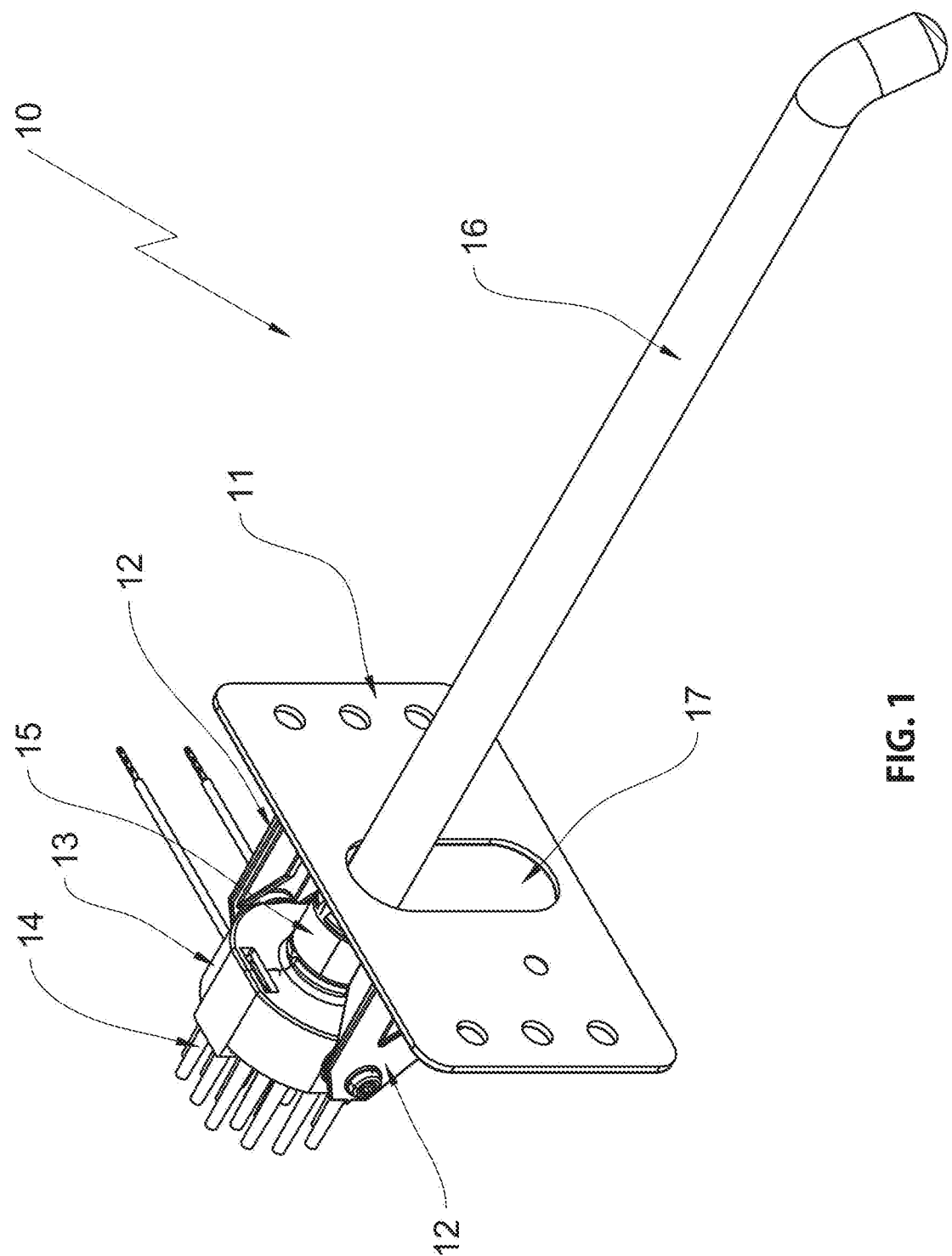
FIG. 1 illustrates an illumination device according to the invention in a perspective view.

In the drawing figures an illumination device in according to the invention is designated overall with reference numeral 10.

The illumination device 10 includes a mounting plate 11 that facilitates mounting the illumination device at a cooking apparatus component, e.g. a support plate. A support dish 13 is arranged at two opposite mounting arms 12 wherein the support dish receives a circuit board with a LED mounted thereon and a cooling element 14 that dissipates operating heat from the LED.

The support dish 13 forms a support collar 15 on a side that is oriented away from the cooling element wherein the support collar envelops a light exit opening. A light conductor rod 16 is inserted into an angular cavity into the support collar 15. The light conductor rod 16 is mechanically supported in the support collar. The mechanical support can be provided in particular by a clamp that presses walls of a slotted support collar 15 against the light conductor rod 16 and thus provides friction locking. As an alternative to the clamp the slotted support collar 15 can also be provided with an external thread so that the support collar 15 can be pressed against the light conductor rod 16 by a nut to provide friction locking. It is also conceivable to establish form locking between the support collar 15 and the light conductor rod e.g. by an interlocking connection.

A cutout 17 of mounting plate 11 allows the light conductor rod 16 to pass through the mounting plate 11.

Figure 2:
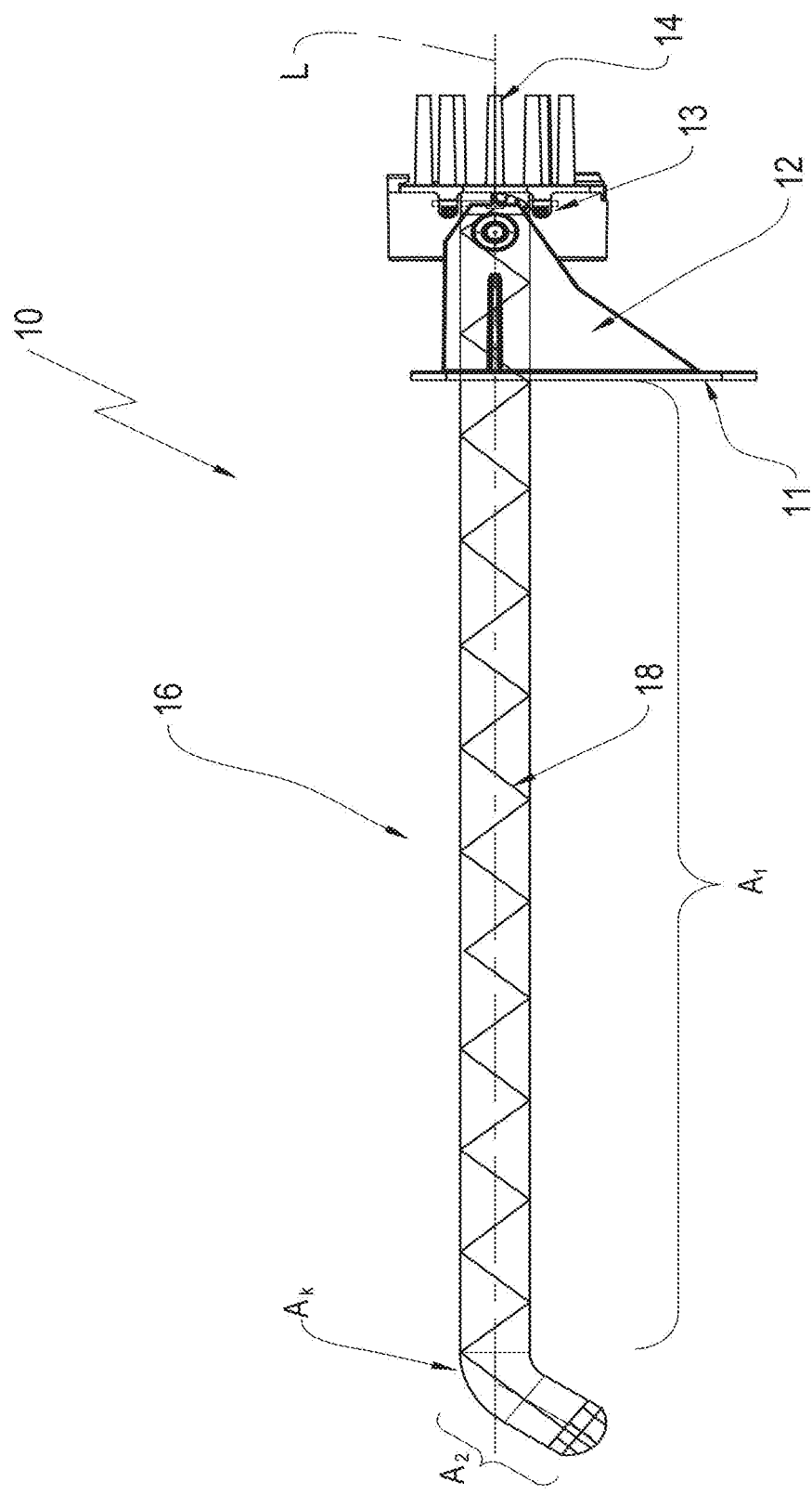
FIG. 2 illustrates illumination device according to FIG. 2 in a side view.

FIG. 2 illustrates a side view of the illumination device 10 described supra. The illustration shows a longitudinal center axis L of the illumination device and a path of a light beam 18 which is introduced by the LED light source into the end of the light conductor rod 16 that is oriented towards the cooling element wherein the light beam exits the light conductor rod 16 at a free end that is oriented away from the cooling element. The light conductor rod 16 includes a first section $A_1$ that extends from the LED light source through the cutout 17 in the mounting plate to a curved section $A_K$ where a second section $A_2$ adjoins that terminates in a free end of the light conductor rod. The curved section $A_K$ or its curvature radius or bending radius is within a total reflection of a light conductor rod material so that the exemplary light beam 18 does not exit the light conductor rod 16 in a portion of the curvature but is reflected in its entirety at an inner surface of the light conductor rod and is reflected through the curvature section $A_K$ into the second section $A_2$.

The light beam 18 exits from the second section $A_2$ wherein a suitable surface structure and surface shape of the free end influences a type of light exit. A suitable satin surface structure provides scatter. Other optically effective surface structures are suitable to provide additional directional control to the light and provide oriented radiation characteristics instead of the defused radiation characteristics recited supra.

It is an essential advantage of the illumination device recited supra to be able to run the light conductor 16 with its first section $A_1$, the non cambered section, outside of the cooking cavity wall and to provide a diameter reduced cooking cavity wall opening only for a section of the light conductor rod that is downstream of the curved section $A_K$ wherein the light enters into the cooking cavity through the cooking cavity wall opening. This way not only the cooking cavity wall opening cross sections are minimized that are required for the illumination. Additionally, the surfaces of the light conductor rod that are subject to the cooking temperature are substantially reduced over the prior art so that a heat dissipation through the light conductor rod into a portion behind the cooking cavity wall is also substantially reduced.

REFERENCES NUMERALS AND DESIGNATIONS

10 illumination device
11 mounting plate
12 mounting arm
13 support dish, light source
14 cooling element
15 support collar
16 light conductor rod
17 cutout
18 light beam
$A_1$ first section
$A_K$ curved section
$A_2$ second section

What is claimed:

1. An illumination device for a cooking apparatus, the illumination device comprising:
   a light source;
   a circular light conductor rod that transmits light emitted by the light source to a cooking cavity; and
   a mounting plate including two opposite support arms that support a support dish that includes a cooling element that dissipates operating heat from the light source,
   wherein the circular light conductor rod is a rigid circular light conductor rod that is supported in the support dish, penetrates the mounting plate and is configured to penetrate an opening in a cooking cavity wall,
   wherein a cylindrical angled end section of the circular light conductor rod that is oriented away from the light source is angled relative to a longitudinal axis of the circular light conductor rod at an angle so that light exiting from the cylindrical angled end section is introducible into the cooking cavity at the angle relative to the longitudinal axis of the circular light conductor rod.

2. The illumination device according to claim 1, wherein the angle of the circular light conductor rod is within limits of a total reflection of a material of the circular light conductor rod.

3. The illumination device according to claim 1, wherein the circular light conductor rod includes a reflective coating in a portion of a curvature of a center line of the circular light conductor rod that forms the angle.

4. The illumination device according to claim 1,
   wherein the circular light conductor rod forms a light exit surface at a light exit end of the circular light conductor rod, and
   wherein the light exit surface includes an optical structure that provides the light with a defined orientation.

5. A cooking apparatus comprising:
   a cooking cavity that is enveloped by a cooking cavity wall,
   wherein the cooking cavity wall includes an opening,
   wherein a lamp component of a lamp is run through the opening,
   wherein the lamp is configured to illuminate the cooking cavity and includes the illumination device according to claim 1, and
   wherein a section of the circular light conductor rod between the light source and the angled end section of the circular light conductor rod is arranged outside of the cooking cavity.

6. The cooking apparatus according to claim 5, wherein a curvature upstream of the angled end section is oriented towards the cooking cavity wall.

7. The cooking apparatus according to claim 6, wherein a section of the circular light conductor rod that is arranged downstream of the curvature extends through the opening in the cooking cavity wall.

8. The cooking apparatus according to claim 5,
wherein the cooling element includes a plurality of frustum shaped circular rods that are oriented parallel to the longitudinal axis of the circular light conductor rod and away from the circular light conductor rod, and
wherein the angled end section of the circular light conductor rod is angled relative respective center axes of the frustum shaped circular rods of the cooling element.

9. The illumination apparatus according to claim 1,
wherein the cooling element includes a plurality of frustum shaped circular rods that are oriented parallel to the longitudinal axis of the circular light conductor rod and away from the circular light conductor rod, and
wherein the angled end section of the circular light conductor rod is angled relative respective center axes of the frustum shaped circular rods of the cooling element.

\* \* \* \* \*